(12) United States Patent  (10) Patent No.: US 7,437,442 B2
Ashiya  (45) Date of Patent: Oct. 14, 2008

(54) NETWORK DATA TRANSFER METHOD

(75) Inventor: Hiroshi Ashiya, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 259 days.

(21) Appl. No.: 10/532,238

(22) PCT Filed: Nov. 18, 2002

(86) PCT No.: PCT/JP02/11993

§ 371 (c)(1),
(2), (4) Date: Apr. 22, 2005

(87) PCT Pub. No.: WO2004/046938

PCT Pub. Date: Jun. 3, 2004

(65) Prior Publication Data

US 2006/0036673 A1   Feb. 16, 2006

(51) Int. Cl.
G06F 15/00 (2006.01)
G06F 12/00 (2006.01)

(52) U.S. Cl. ............... 709/223; 709/224; 709/227; 707/203; 358/1.16; 358/1.9

(58) Field of Classification Search ............ 709/223; 370/401
See application file for complete search history.

(56) References Cited

U.S. PATENT DOCUMENTS 6,138,162 A * 10/2000 Pistriotto et al. ............ 709/229
6,173,311 B1 * 1/2001 Hassett et al. .............. 709/202
6,195,694 B1   2/2001 Chen et al.
7,025,255 B1 * 4/2006 Drummond et al. ......... 235/379
7,080,155 B1 * 7/2006 Hericourt .................... 709/238
7,173,730 B1 * 2/2007 Suzuki et al. ............... 358/1.16
7,181,619 B2 * 2/2007 Motoyama et al. .......... 713/168

(Continued)

FOREIGN PATENT DOCUMENTS

JP  11-234270 A  8/1999

(Continued)

OTHER PUBLICATIONS

Azumi Yasuhiro, NPL (Homepage Generating Method, Homepage Browsing Method, and Generation and Browsing System for Homepage), Jun. 28, 2002, JP, 2002-183114—Machine translation to English.*

(Continued)

Primary Examiner—Jeffrey Pwu
Assistant Examiner—Sulaiman Nooristany
(74) Attorney, Agent, or Firm—Sughrue Mion, PLLC

(57) ABSTRACT

A network data-transfer method of transferring data from a server on a network to a network-connected equipment without having a user interface to make the network-connected equipment perform a processing includes relaying an access between the server and a client to represent for the access by the network-connected equipment; creating a transfer-data to be transferred to the client as a response to the access to the server at the relaying by putting a processing data for the network-connected equipment in the transfer-data; and a transfer-data processing by the network-connected equipment, the transfer-data processing including acquiring the transfer-data created at the creating, extracting the processing data from the transfer-data, and processing the processing data extracted.

9 Claims, 8 Drawing Sheets

U.S. PATENT DOCUMENTS

| | | | |
|---|---|---|---|
| 7,197,041 B1 * | 3/2007 | Tyebji | 370/401 |
| 2001/0023451 A1 * | 9/2001 | Hericourt | 709/232 |
| 2002/0116407 A1 * | 8/2002 | Negishi et al. | 707/203 |

FOREIGN PATENT DOCUMENTS

| | | |
|---|---|---|
| JP | 11-345244 A | 12/1999 |
| JP | 2000-057041 A | 2/2000 |
| JP | 2000-165407 A | 6/2000 |
| JP | 2000-311119 A | 11/2000 |
| JP | 2002-159074 A | 5/2002 |
| JP | 2002-183114 A | 6/2002 |
| JP | 2002-215503 A | 8/2002 |

OTHER PUBLICATIONS

International Preliminary Examination Report.

* cited by examiner

NETWORK DATA TRANSFER METHOD

TECHNICAL FIELD

The present invention relates to a network data-transfer method in which data is transferred from a server on a network to a network-connected equipment, which does not have a user interface, so as to be processed. More specifically, the present invention relates to a network data-transfer method that can easily transfer-data to the network-connected equipment, which does not have a user interface, so as to be processed, even when a firewall is set up.

BACKGROUND ART

Conventionally, when a user transfers data such as files or setup data required for the network-connected equipment from a server on the network to the network-connected equipment such as a printer or a FAX machine, which does not have a user interface sufficient for operating a web browser such as a screen, a keyboard, and a mouse, so that processing is performed by the network-connected equipment, the user accesses the server by using some kind of means, such as by transmitting a request from client equipment having a user interface, such as a personal computer, and the server side accesses the network-connected equipment by a protocol such as a trivial file transfer protocol (TFTP) or a file transfer protocol (FTP), to transfer the data.

However, only when the server on the network can directly access the network-connected equipment by using these protocols, the data can be transferred to the network-connected equipment by these means.

Particularly, when data is transferred from the server on the Internet other than the firewall to the network-connected equipment connected to the Intranet in the firewall by using the TFTP or the FTP, access by these protocols from outside the firewall is in many cases not permitted for security reasons. Therefore, there is a problem in that the access from the server outside the firewall with respect to the network-connected equipment connected to the Intranet is rejected, and data cannot be transferred.

There is disclosed a conventional technique in which setup data is transferred to the network-connected equipment having no user interface from the server on the network by using the TFTP to perform setup (see, for example, Japanese Patent Application Laid-Open No. 2000-165407).

When the user transfers data such as necessary files and setup data to the network-connected equipment, which does not have a user interface sufficient for operating a web browser, such as a screen, a keyboard, and a mouse, so that processing is performed, conventionally, the data is once transferred from a data recording medium such as a floppy (registered trademark) disk or a compact disk-read only memory (CD-ROM) attached to the network-connected equipment to a setting personal computer, and then the data is transferred to the network-connected equipment.

However, when the data is transferred to the network-connected equipment by such means, since the data is once stored in the setting personal computer, and then transferred to the network equipment, it takes time to transfer-data.

When the data for the network-connected equipment is transferred from the server on the network, if the data is updated by an administrator of the server, the updated data can be transferred at any time. However, the data stored in the data recording medium attached to the network-connected equipment is not updated, and hence, there is a problem in that the data becomes out-dated.

When the user transfers files, setup data, and the like required for the network-connected equipment so as to be processed, with respect to the network-connected equipment, which does not have a user interface sufficient for operating the web browser, such as a screen, a keyboard, and a mouse, conventionally, the user accesses the server on the network by using the setting personal computer, once transfers the data from the server on the network to the setting personal computer, and then transfers the data to the network-connected equipment.

However, when the data is transferred to the network-connected equipment by such means, since the data is once stored in the setting personal computer, and then transferred to the network-connected equipment, it takes time to transfer-data.

The present invention has been achieved in order to solve the above problems in the conventional technique. It is an object of the present invention to provide a network data-transfer method that can easily transfer-data from the server on the network to the network-connected equipment having no user interface so as to perform processing, and particularly, that can easily transfer-data to the network-connected equipment having no user interface, so as to perform processing, even when a firewall is set up.

DISCLOSURE OF THE INVENTION

To solve the above problems and to achieve the goal, a network data-transfer method of transferring data from a server on a network to a network-connected equipment without having a user interface to make the network-connected equipment perform a processing, according to present invention includes relaying an access between the server and a client to represent for the access by the network-connected equipment; creating a transfer-data to be transferred to the client as a response to the access to the server at the relaying by putting a processing data for the network-connected equipment in the transfer-data; and a transfer-data processing by the network-connected equipment, the transfer-data processing including acquiring the transfer-data created at the creating, extracting the processing data from the transfer-data, and processing the processing data extracted.

According to the present invention, the network-connected equipment having no user interface relays an access between the server and the client on the network to represent for the access. The server pads the processing data processed by the network-connected equipment in the transfer-data to be transferred to the client as a response to the access, to create the transfer-data. The network-connected equipment then obtains the transfer-data, and extracts the processing data to perform the processing.

According to the network data-transfer method according to the present invention, the creating includes putting, when the server transfers markup language format data to the network-connected equipment as a response to the access, a predetermined special-character string for identification indicating a data area where processing-data to be processed by the network-connected equipment is described in a comment portion in a comment tag of the markup language format data; and putting the processing-data in a data area indicated by the special-character string for identification.

According to the present invention, a predetermined special-character string for identification indicating a data area, in which processing data processed by the network-connected equipment is described, is padded in a comment portion in a comment tag in markup language format data transferred to the network-connected equipment as a response to the access from the client to the server, and the processing data is padded in the data area.

According to the network data-transfer method according to the present invention, the transfer-data processing includes a data extracting including obtaining the markup language format data from the server, monitoring the special-character string for identification in the markup language format data, and extracting the processing-data located in the data area indicated by the special-character string for identification; and processing the processing-data extracted at the data extracting by the network-connected equipment based on a type of the processing-data.

According to the present invention, the network-connected equipment monitors the special-character string for identification in the markup language format data obtained from the server, extracts processing data located in the data area indicated by the special-character string for identification, and processes the processing data by the network-connected equipment according to the type of the extracted processing data.

According to the network data-transfer method according to the present invention, the putting the processing-data includes putting a text format file to be processed by the network-connected equipment in the data area indicated by the special-character string for identification.

According to the present invention, a text format file to be processed by the network-connected equipment is padded in the data area indicated by the special-character string for identification in the markup language format data.

According to the network data-transfer method according to the present invention, the putting the processing-data includes putting setup data for the network-connected equipment to be processed by the network-connected equipment in the data area indicated by the special-character string for identification.

According to the present invention, setup data of the network-connected equipment to be processed by the network-connected equipment is padded in the data area indicated by the special-character string for identification in the markup language format data.

According to the network data-transfer method according to the present invention, the putting the processing-data includes putting a script that causes the network-connected equipment to perform an execution in the data area indicated by the special-character string for identification.

According to the present invention, a script for processing executed by the network-connected equipment is padded in the data area indicated by the special-character string for identification in the markup language format data.

According to the network data-transfer method according to the present invention, the putting the processing-data includes putting position data of a file to be processed by the network-connected equipment on the network in the data area indicated by the special-character string for identification.

According to the present invention, the position data of the file processed by the network-connected equipment on the network is put in the data area indicated by the special-character string for identification in the markup language format data.

According to the network data-transfer method according to the present invention, the data extracting includes, when the processing-data to be processed by the network-connected equipment is a text format file, extracting the file, and the processing the processing-data includes storing the file extracted.

According to the present invention, when the processing data to be processed by the network-connected equipment is the text format file, the file is extracted and stored.

According to the network data-transfer method according to the present invention, the data extracting includes, when the processing-data to be processed by the network-connected equipment is the setup data for the network-connected equipment, extracting the setup data, and the processing the processing-data includes setting up the network-connected equipment based on the setup data extracted.

According to the present invention, when the processing data to be processed by the network-connected equipment is the setup data of the network-connected equipment, the setup data is extracted, and the setup of the network-connected equipment is performed according to the extracted setup data.

According to the network data-transfer method according to the present invention, the data extracting includes, when the processing-data to be processed by the network-connected equipment is the script, extracting the script, and the processing the processing data includes processing the processing data based on the script.

According to the present invention, when the processing data to be processed by the network-connected equipment is the script for processing executed by the network-connected equipment, the script is extracted, and the processing is executed according to the extracted script.

According to the network data-transfer method according to the present invention, the data extracting includes, when the processing-data to be processed by the network-connected equipment is a text format file, extracting the position data, extracting the position data, and the processing the processing-data includes, based on the position data extracted, acquiring the file to be processed by the network-connected equipment from the network, and storing the file.

When the processing data processed by the network-connected equipment is the position data of the file processed by the network-connected equipment on the network, the position data is extracted to obtain the file from the network based on the extracted position data, and the file is stored.

BEST MODE FOR CARRYING OUT THE INVENTION

Exemplary embodiments of a network data-transfer method according to the present invention will be explained in detail with reference to the accompanying drawings. The markup language includes a hyper text markup language (HTML), standard generalized markup language (SGML), extensible markup language (XML), and the like, however, the HTML is employed herein. Further, a hyper text transfer protocol (HTTP) is employed herein as a protocol for transmitting/receiving data described in the HTML, and a personal computer into which a web browser is introduced is employed herein as one example of a network-connected equipment having a user interface.

Figure 1:
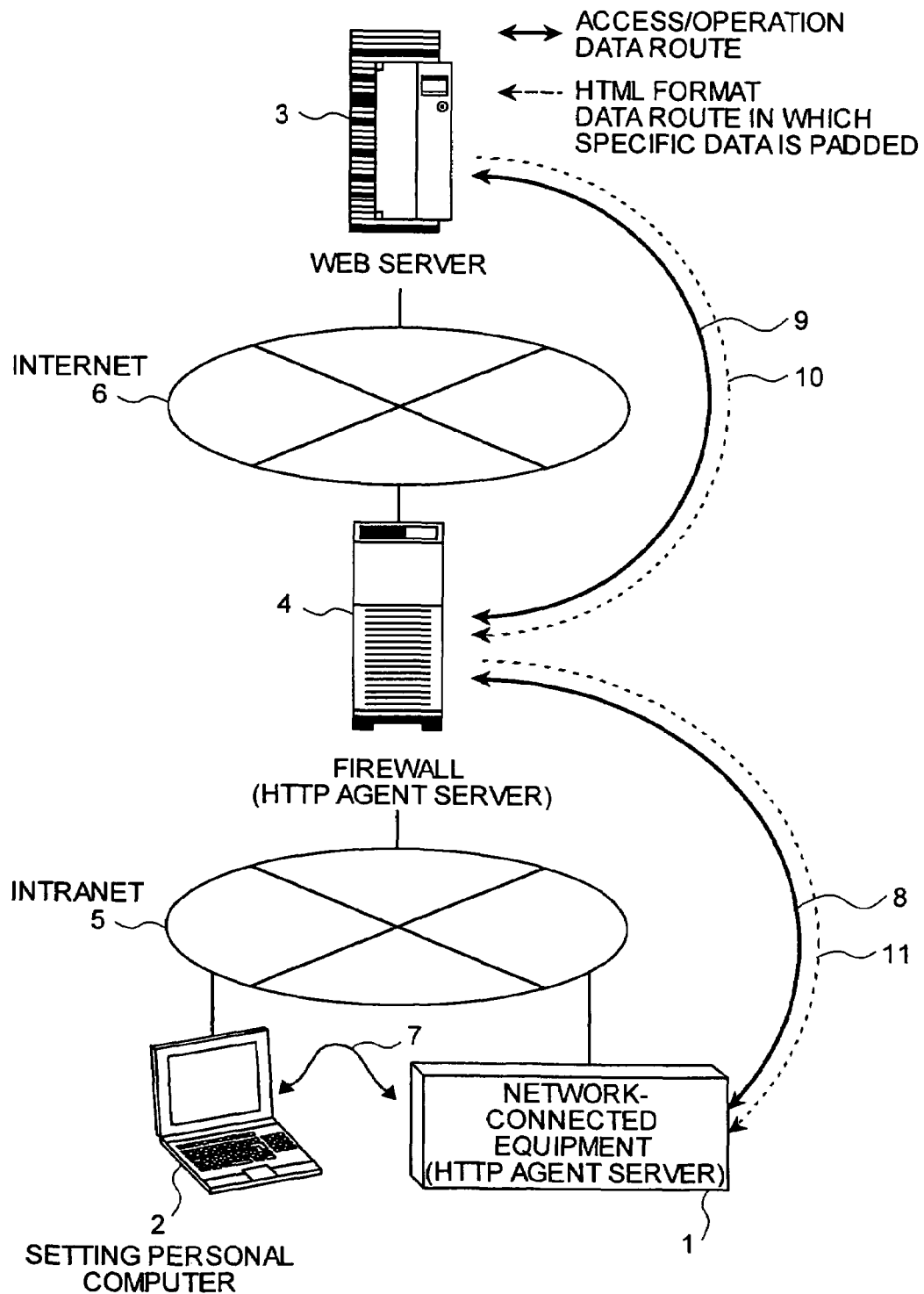
FIG. 1 is a conceptual diagram of a network data-transfer method according to a first embodiment.

The concept of a network data-transfer method according to a first embodiment will be explained first. FIG. 1 is a conceptual diagram of the network data-transfer method according to the first embodiment.

As shown in the drawing, a user accesses and operates a web browser on a setting personal computer 2, to request a network-connected equipment 1 having an HTTP agent server function but having no user interface, to access a web server 3 so as to transfer specific data from the web server 3 to the network-connected equipment 1, via the Intranet 5 (access/operation data route 7).

Here, the "HTTP agent server function" stands for a generally used function as an HTTP agent server, that is, a function of relaying and representing for an access to other networks with respect to the network-connected equipment connected to the Intranet 5, such as the setting personal computer 2. The "specific data" stands for data such as files, setup data, and a script to be executed by the network-connected equipment 1, required for the network-connected equipment 1 and selected by the user.

The network-connected equipment 1 having received the request from the user accesses a firewall 4 having the HTTP agent server function via the Intranet 5, to request the firewall 4 to access the web server 3 to transfer-data from the web server 3 to the network-connected equipment 1 (access/operation data route 8).

The firewall 4 having received this request accesses the web server 3 via the Internet 6 (access/operation data route 9), and requests the web server 3 to transfer the HTML format data in which the specific data for the network-connected equipment 1 is padded (access/operation data route 9).

The web server 3 responds to the request, and pads the specific data for the network-connected equipment 1 in the HTML format data and transfers the data to the firewall 4 (HTML format data route 10 in which the specific data is padded). Thereafter, the firewall 4 transfers the HTML format data to the network-connected equipment 1 (HTML format data route 11 in which the specific data is padded).

The network-connected equipment 1 receives the HTML format data transferred from the firewall 4 and extracts the specific data required for the network-connected equipment 1 from the received data, to perform the processing for the specific data. The remaining portion of the HTML format data after the specific data has been extracted is transferred to the setting personal computer 2 (access/operation data route 7), and the HTML format data is interpreted by the web browser and read by the user.

Figure 2:
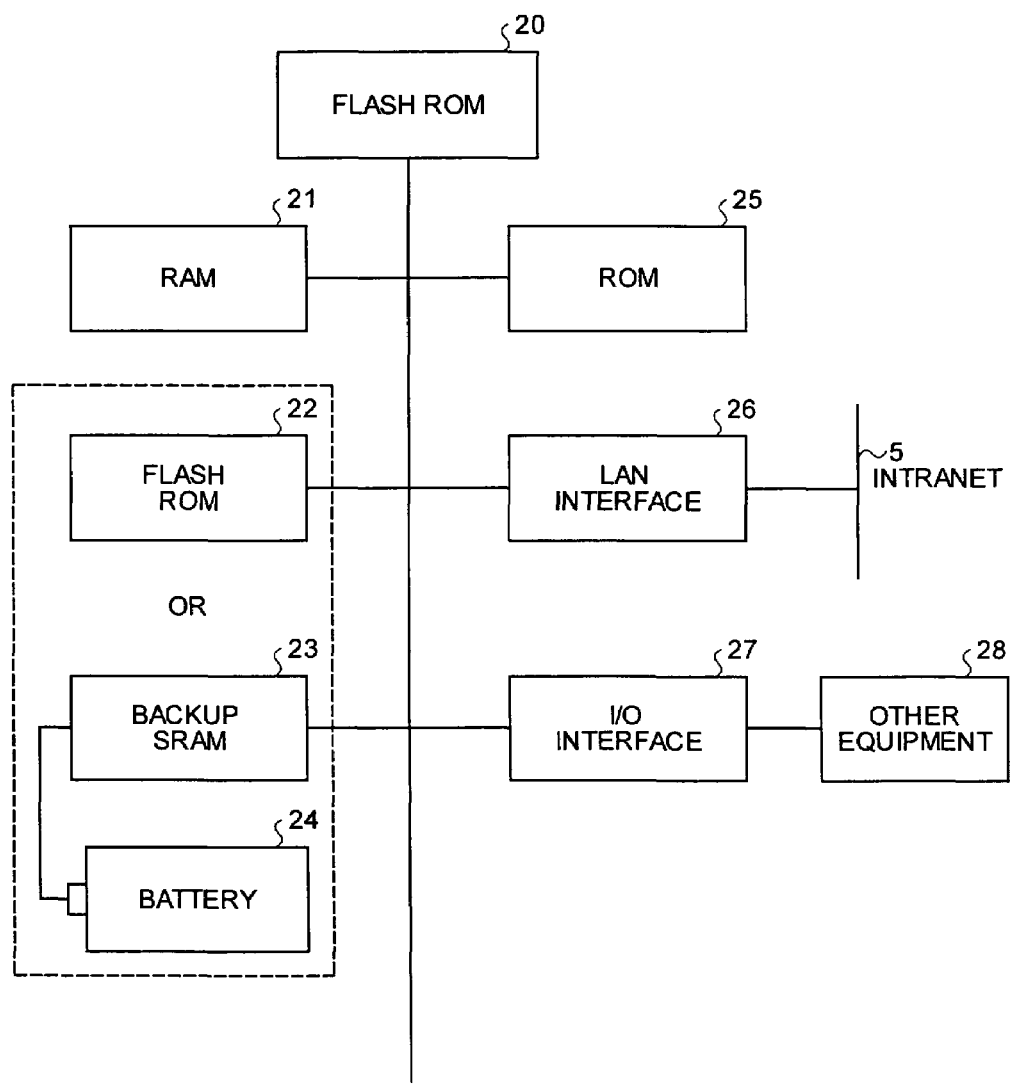
FIG. 2 is a hardware block diagram of the network-connected equipment having no user interface according to the first embodiment.

The hardware configuration of the network-connected equipment 1 having no user interface according to the first embodiment will be explained next. FIG. 2 is a hardware block diagram of the network-connected equipment 1 having no user interface according to the first embodiment.

As shown in the drawing, a central processing unit (CPU) 20 controls the network-connected equipment 1, and performs processing with respect to the data transferred from the web server 3. A read only memory (ROM) 25 holds an operating system (OS) and programs for providing the HTTP agent server function. A random access memory (RAM) 21 holds data for operating these programs. A flash ROM 22 or a backup static random-access-memory (SRAM) 23 holds specific data for the network-connected equipment 1 transferred from the web server 3, as a nonvolatile memory. Note that when the backup SRAM 23 is provided, a battery 24 for holding the data is further included. A local area network (LAN) interface 26 provides a network interface for connecting to the Intranet 5. An I/O interface 27 provides an interface for connecting to other equipment 28 by a connection standard such as serial, universal serial bus (USB), or IEEE 1394.

Figure 3:
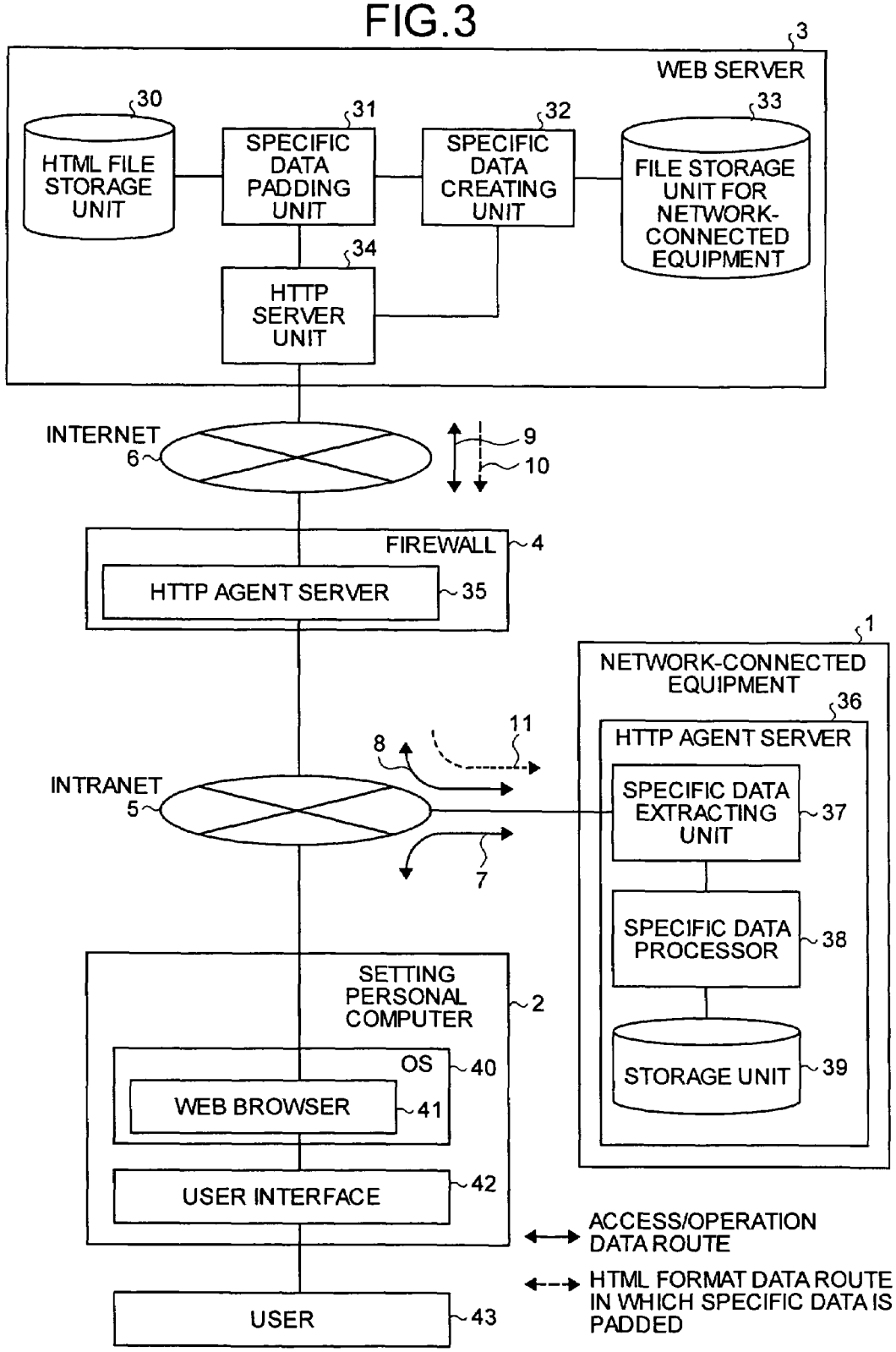
FIG. 3 is a block diagram of the overall configuration of a network system having the network data-transfer method according to the first embodiment.

The overall configuration of a network system having the network data-transfer method according to the first embodiment will be explained next. FIG. 3 is a block diagram of the overall configuration of the network system having the network data-transfer method according to the first embodiment.

As shown in this drawing, a user 43 operates a mouse, a keyboard, and the like being a user interface 42 of the setting personal computer 2, while looking at a screen of a display device, also being the user interface 42, to activate a web browser 41 operated on an OS 40.

An IP address and a port number of the network-connected equipment 1 are set in the web browser 41 so that the web browser 41 accesses the HTTP agent server 36 in the network-connected equipment 1. Here, the IP address of the network-connected equipment 1 and a port number for accepting the access are preset in the network-connected equipment 1, so that the network-connected equipment 1 can accept the access from the web browser 41.

As described in the first embodiment, when a higher rank HTTP agent server 35 is used, the IP address and the port number of the HTTP agent server 35 are set in the HTTP agent server 36 of the network-connected equipment 1, so that the web browser 41 accesses the HTTP agent server 35.

When the user 43 inputs a uniform resource locator (URL) of the web server 3 that provides the specific data required for the network-connected equipment 1 to an URL input unit of the web browser 41, the access to the web server 3 via the HTTP agent server 36 and the HTTP agent server 35 becomes possible (access/operation data routes 7, 8, and 9).

An HTTP server unit 34 in the web server 3 responds to the access from the user 43. The HTML format data for the user 43 is transmitted to the setting personal computer 2 via the HTTP agent server 35 and the HTTP agent server 36 (access/operation data routes 9, 8, and 7), and the HTML format data is read by the web browser 41.

Here, a function of a form and the like constituted by a field and a button for an input is used for the HTML format data, so that the user 43 can select the type and setup of the specific data, which the user 43 wants to transfer to the network-connected equipment 1 from the web server 3.

When the user 43 selects the type and setup of the specific data, which the user 43 wants to transfer to the network-connected equipment 1, the information of the type and setup of the selected specific data is transmitted to the HTTP server unit 34 in the web server 3. The HTTP server unit 34 transfers the information of the type and setup of the obtained data to a specific data creating unit 32, and the specific data creating unit 32 creates specific data of the appropriate type and setup. At this time, when the user 43 wants to transfer a file to the network-connected equipment 1, the specific data creating unit 32 obtains the file from a file storage unit 33 for the network-connected equipment to create the specific data.

When a file to be processed by the network-connected equipment 1 is transferred according to the selection of the user 43, the specific data creating unit 32 compresses a single or a plurality of selected files, and converts the binary compressed file to a text format. As a method of converting the file to a text format, a Unix Unix encode (UUEncode) defined as a Portable Operating System Interface for UNIX (POSIX) by the Institute of Electrical and Electronic Engineers (IEEE), or the Multipurpose Internet mail extensions (MIME) method defined in the request for comments (RFC) issued by the US Internet engineering task force (IETF) can be used. Further, as required, information of the expansion destination at which the compressed file is to be expanded is added thereto.

When the setup data to be processed by the network-connected equipment 1 is transferred according to the selection by the user 43, the specific data creating unit 32 creates the setup data of the network-connected equipment 1 desired by the user 43. For example, the specific data creating unit 32 creates setup data including a command such as "change a value at a certain address in the address in the memory map in the network-connected equipment 1 to a certain value" or "update a certain portion in the setup file in the network-connected equipment 1".

When the script to be processed by the network-connected equipment 1 is transferred according to the selection by the user 43, the specific data creating unit 32 creates a script to be executed by the network-connected equipment 1 desired by the user 43. The script is described, for example, such that the network-connected equipment 1 can execute processing such as decompressing processing of a compressed file, file operation, and reactivation of the network-connected equipment 1.

A specific data padding unit 31 pads the specific data created by the specific data creating unit 32 in the HTML format data. The HTML format data is for responding to the web browser 41 that has issued a request of data transfer to the network-connected equipment, and is stored in a HTML file storage unit 30.

Specifically, when padding the specific data to be transferred to the network-connected equipment 1, the specific data padding unit 31 pads a comment starting tag indicating a start of a commentline, and subsequently, pads the special-character string for identification, and a comment ending tag indicating the end of the commentline, and then pads the processing data to be processed by the network-connected equipment 1 between the special-character string for identification and the comment ending tag.

Here, the special-character string for identification is predefined, and stored in the network-connected equipment 1 and the web server 3. The special-character string for identification is complicated and is the one that is not used for other purposes, in order to prevent a malfunction of the network-connected equipment 1. When there is a portion having the same character string as that of the comment ending tag in the specific data to be padded, this portion is replaced by another character string.

When the specific data is not transferred to the network-connected equipment 1, the HTML format data for response may be created without including the specific data. The order of padding the data such as files, setup data, and scripts is optional, and for example, by padding a script before and after the file data or in a space in the setup data, the timing for performing the script processing can be determined, such as processing to be performed before expansion of the file and before setup of the network-connected equipment 1, processing to be performed after expansion of the file and before setup of the network-connected equipment 1, and processing to be performed after expansion of the file and after setup of the network-connected equipment 1.

The HTML format data in which the created specific data is padded is handed over to the HTTP server unit 34, and transferred to the HTTP agent server 36 in the network-connected equipment 1 via the Internet 6, the HTTP agent server 35 in the firewall 4, and the Intranet 5 (the HTML format data routes 10 and 11 in which the specific data is padded).

A specific data extracting unit 37 in the HTTP agent server 36 monitors the special-character string for identification subsequent to the comment starting tag in the HTML format data passing through the HTTP agent server 36. When detecting the special-character string for identification in the HTML format data, the specific data extracting unit 37 extracts the specific data in a portion put between the comment starting tag and the comment ending tag, and hands over the specific data to a specific data processor 38.

When the extracted specific data is a compressed text format file, the specific data processor 38 binarizes the file, and expands the file in a storage unit 39, being an expansion destination specified in the specific data, and stores the file. When the extracted specific data is the setup data of the network-connected equipment 1, the specific data processor 38 sets up the network-connected equipment 1 according to the setup information included in the setup data. When the extracted specific data is the script to be processed by the network-connected equipment 1, the specific data processor 38 causes the network-connected equipment 1 to execute the processing according to the described procedure.

The remaining HTML format data after the specific data for the network-connected equipment 1 has been extracted is the same as the one before the specific data for the network-connected equipment 1 is padded, and is transferred to the web browser 41 of the setting personal computer 2, via the Intranet 5 as a general HTML format data (access/operation data route 7).

The web browser 41 analyzes the obtained HTML format data and displays the result. The user 43 can see the result on the screen of the display device, being the user interface 42. The display example of the obtained HTML format data includes a message informing the user 43 of the completion of the data transfer to the network-connected equipment 1.

Figure 4:
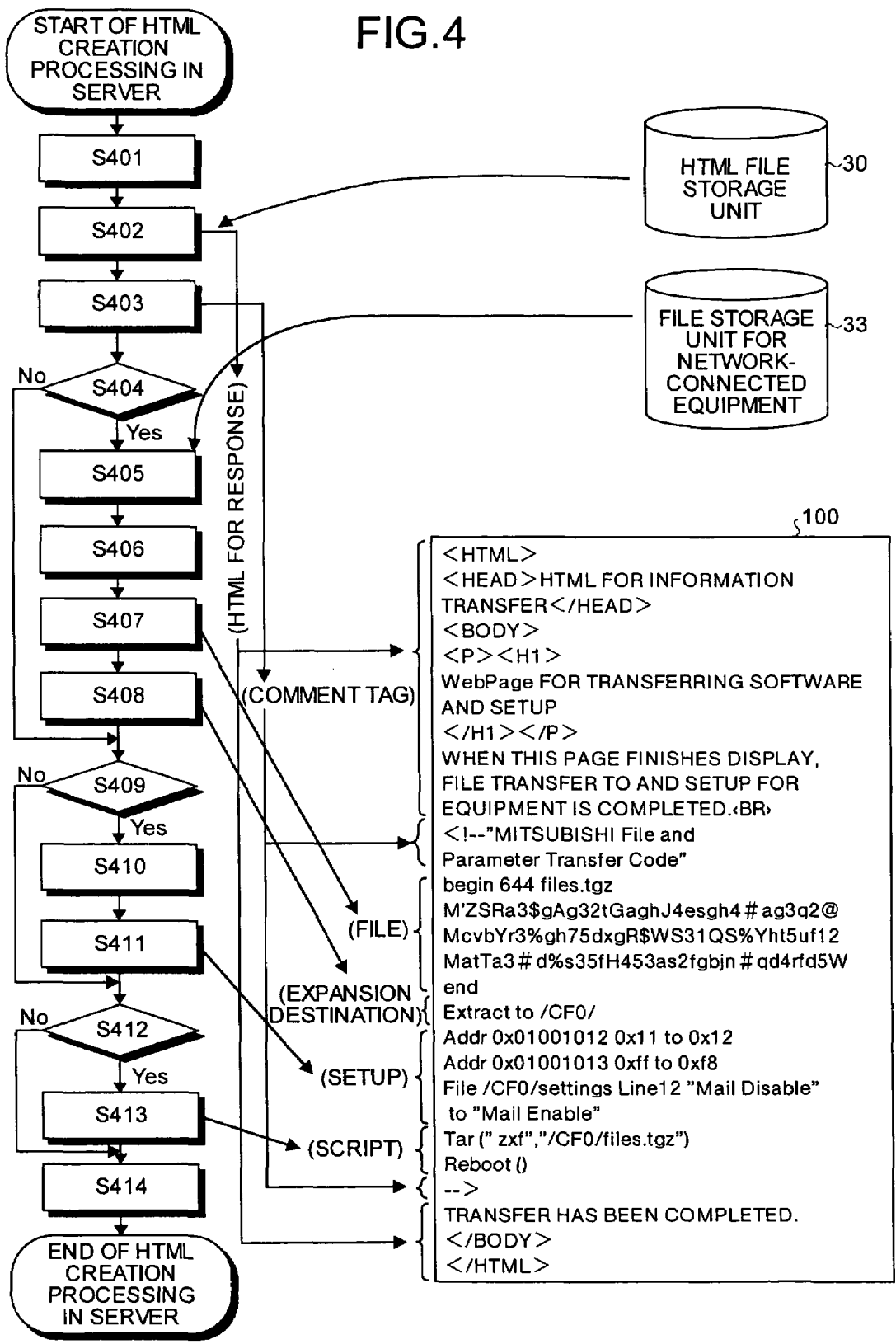
FIG. 4 is a flowchart of a processing procedure in creation processing of HTML format data in a web server according to the first embodiment.

The processing procedure in the creation processing of the HTML format data in the web server 3 according to the first embodiment will be specifically explained. FIG. 4 is a flowchart of the processing procedure in the creation processing of the HTML format data in the web server 3 according to the first embodiment.

As shown in the drawing, the user 43 requests the web server 3 to transfer the specific data to the network-connected equipment 1. The HTTP server unit 34 in the web server 3 receives the request (step S401), selects an appropriate HTML file for response with respect to the request, and obtains the file from the HTML file storage unit 30 (step S402). The HTTP server unit 34 then inserts the comment starting tag, the special-character string for identification, and the comment ending tag in the HTML format data for response (step S403).

Subsequently, the HTTP server unit 34 determines whether there is a file transfer request from the user 43 (step S404). When there is the request (step S404, Yes), the specific data creating unit 32 selects a single or a plurality of files from a file storage unit 33 for network-connected equipment (step S405). The specific data creating unit 32 then compresses the selected file (step S406) and converts the file to a text format (step S407). Further, the specific data creating unit 32 specifies an expansion destination at which the compressed text format file is expanded (step S408). If the expansion destination is not specified, the expansion destination will be the one for default specified beforehand. When there is no file transfer request from the user 43 (step S404, No), control proceeds to step S409.

Subsequently, the HTTP server unit 34 determines whether there is a transfer request of the setup data for the network-connected equipment 1 from the user 43 (step S409). When there is the request (step S409, Yes), the specific data creating unit 32 determines the setup data required for setting up the network-connected equipment 1 (step S410), and converts the setup data to a text format (step S411). When there is no setup data transfer request from the user 43 (step S409, No), control proceeds to step S412.

The HTTP server unit 34 determines whether there is a transfer request of a script to be executed by the network-connected equipment 1 from the user 43 (step S412). When there is the request (step S412, Yes), the specific data creating unit 32 determines the script to be executed by the network-connected equipment 1 (step S413). When there is no script transfer request from the user 43 (step S412, No), control proceeds to step S414.

When the specific data including the file, the setup data, and the script according to the above processing is determined, the specific data padding unit 31 pads the specific data between the special-character string for identification and the comment ending tag (step S414), to finish the creation processing of the HTML format data.

In the drawing, an example 100 of the HTML format data having the specific data padded therein is shown. As shown in the drawing, there are the comment starting tag (<!--), the special-character string for identification ("MITSUBISHI File and Parameter Transfer Code") subsequent thereto, and the comment ending tag (-->) in the HTML format data for response, and the file, the file expansion destination data, the setup data, and the script are padded between the special-character string for identification and the comment ending tag.

Figure 5:
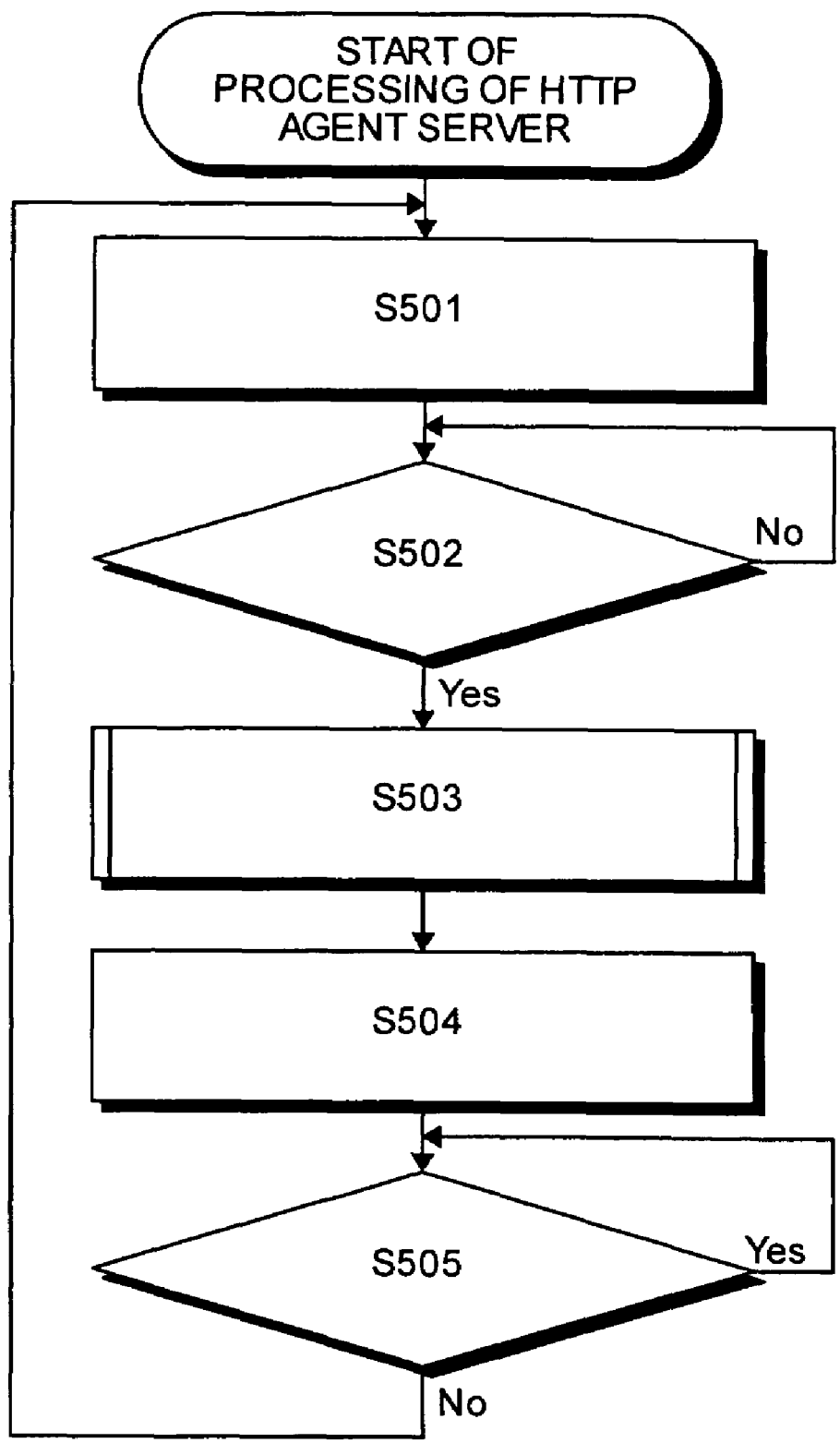
FIG. 5 is a flowchart of a processing procedure in agent server processing by an HTTP agent server in the network-connected equipment having no user interface according to the first embodiment.

A processing procedure in agent server processing by the HTTP agent server 36 in the network-connected equipment 1 having no user interface according to the first embodiment will be explained next. FIG. 5 is a flowchart of a processing procedure in the agent server processing by the HTTP agent server 36 in the network-connected equipment 1 having no user interface according to the first embodiment.

As shown in the drawing, the HTTP agent server 36 first creates a socket for waiting for the connection from the web browser 41 at a predetermined port number (step S501). After the socket is created, the HTTP agent server 36 waits for a connection request from the web browser 41 (step S502), and when there is the connection request (step S502, Yes), activates an agent processing task for processing the connection (step S503). When there is no connection request (step S502, No), the HTTP agent server 36 waits for a connection request (step S502).

Thereafter, the HTTP agent server 36 counts the number of accepted connection (step S504), and when the number of connections exceeds a preset maximum number (step S505, Yes), waits until other connection processing finishes (step S505). When the number of connections does not exceed the preset maximum number (step S505, No), the HTTP agent server 36 repeats the above processing (from step S501 to step S504).

Figure 6:
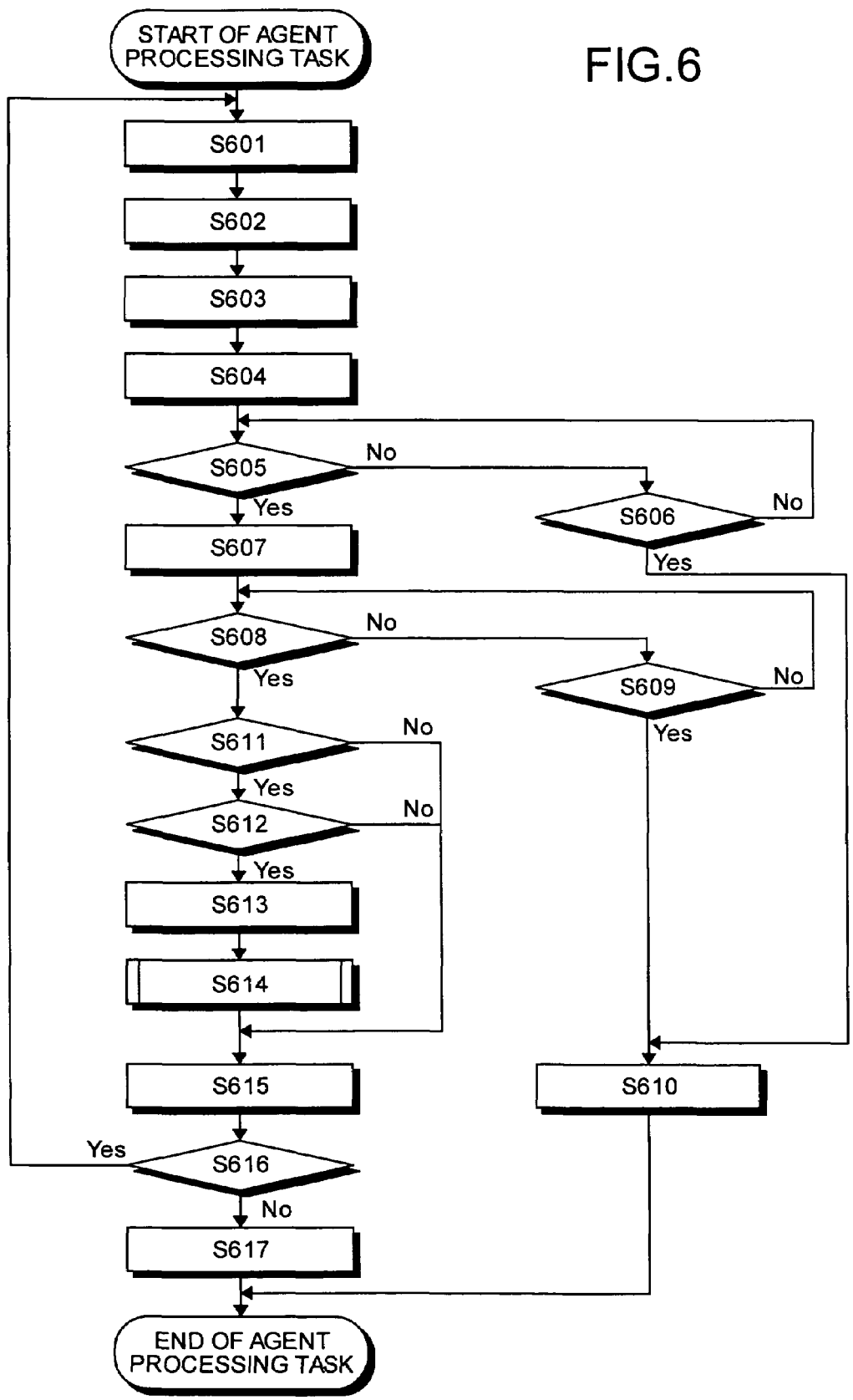
FIG. 6 is a flowchart of a processing procedure of an agent processing task in the agent server processing according to the first embodiment.

Details of the agent processing task (step S503) in the agent server processing shown in FIG. 5 according to the first embodiment will be explained below. FIG. 6 is a flowchart of a processing procedure of the agent processing task in the agent server processing according to the first embodiment.

The HTTP agent server 36 first accepts an HTTP message from the web browser 41 (step S601). The HTTP agent server 36 then extracts an URL of a web page, which the user 43 wants to access and operate, from the accepted HTTP message (step S602). Further, the HTTP agent server 36 extracts the name of the web server 3 to be connected from the URL (step S603), and transmits a connection request to the web server 3 via the HTTP agent server 35 (step S604).

The HTTP agent server 36 then checks if the connection to the web server 3 is completed (step S605), and when the connection is completed (step S605, Yes), the HTTP agent server 36 transmits a message same as the HTTP message received from the web browser 41 to the web server 3 via the HTTP agent server 35 (step S607). When connection is not completed yet (step S605, No), the HTTP agent server 36 checks if the connection request becomes time-out (step S606), and if it is not time-out (step S606, No), the HTTP agent server 36 waits for a response from the web server 3, which has issued the connection request (step S605). If it is time-out (step S606, Yes), the HTTP agent server 36 transmits a response indicating time-out to the web browser 41 (step S610).

After transmitting the HTTP message to the web server 3 (step S607), the HTTP agent server 36 checks if there is a response of the HTML format data from the web server 3 (step S608), and when there is the response (step S608, Yes), checks if there are the comment starting tag and the comment ending tag therein (step S611).

When there is no response from the web server 3 (step S608, No), the HTTP agent server 36 checks if the response request becomes time-out (step S609), and if it is not time-out (step S609, No), waits for a response of the HTML format data from the web server 3 (step S608). If it is time-out (step S609, Yes), the HTTP agent server 36 transmits a response indicating time-out to the web browser 41 (step S610).

When there are the comment starting tag and the comment ending tag therein (step S611, Yes), the HTTP agent server 36 checks if there is a predetermined special-character string for identification just behind the comment starting tag (step S612). If there are no comment starting tag and comment ending tag therein (step S611, No), control proceeds to step S615.

When there is the special-character string for identification just behind the comment starting tag (step S612, Yes), the HTTP agent server 36 extracts a comment portion put between the comment starting tag and the comment ending tag (step S613), and activates a specific data processing task to hand over the extracted portion (step S614). If there is no special-character string for identification just behind the comment starting tag (step S612, No), control proceeds to step S615.

When there are no comment starting tag and comment ending tag therein (step S611, No), or when there is no special-character string for identification just behind the comment starting tag (step S612, No), the HTTP agent server 36 directly transfers the response of the HTML format data from the web server 3 to the web browser 41 (step S615). When there are the comment starting tag, the special-character string for identification, and the comment ending tag therein (step S611, Yes, and step S612, Yes), the HTTP agent server 36 transfers the remaining portion of the HTML format data after the comment portion has been extracted to the web browser 41 (step S615).

After finishing the transfer, the HTTP agent server 36 checks if it is necessary to maintain the connection (step S616), and when it is necessary (step S616, Yes), repeats the above processing (from step S601 to step S615). When it is not necessary (step S616, No), the HTTP agent server 36 cuts off the connection, to reduce the number of accepted connections by one (step S617).

Figure 7:
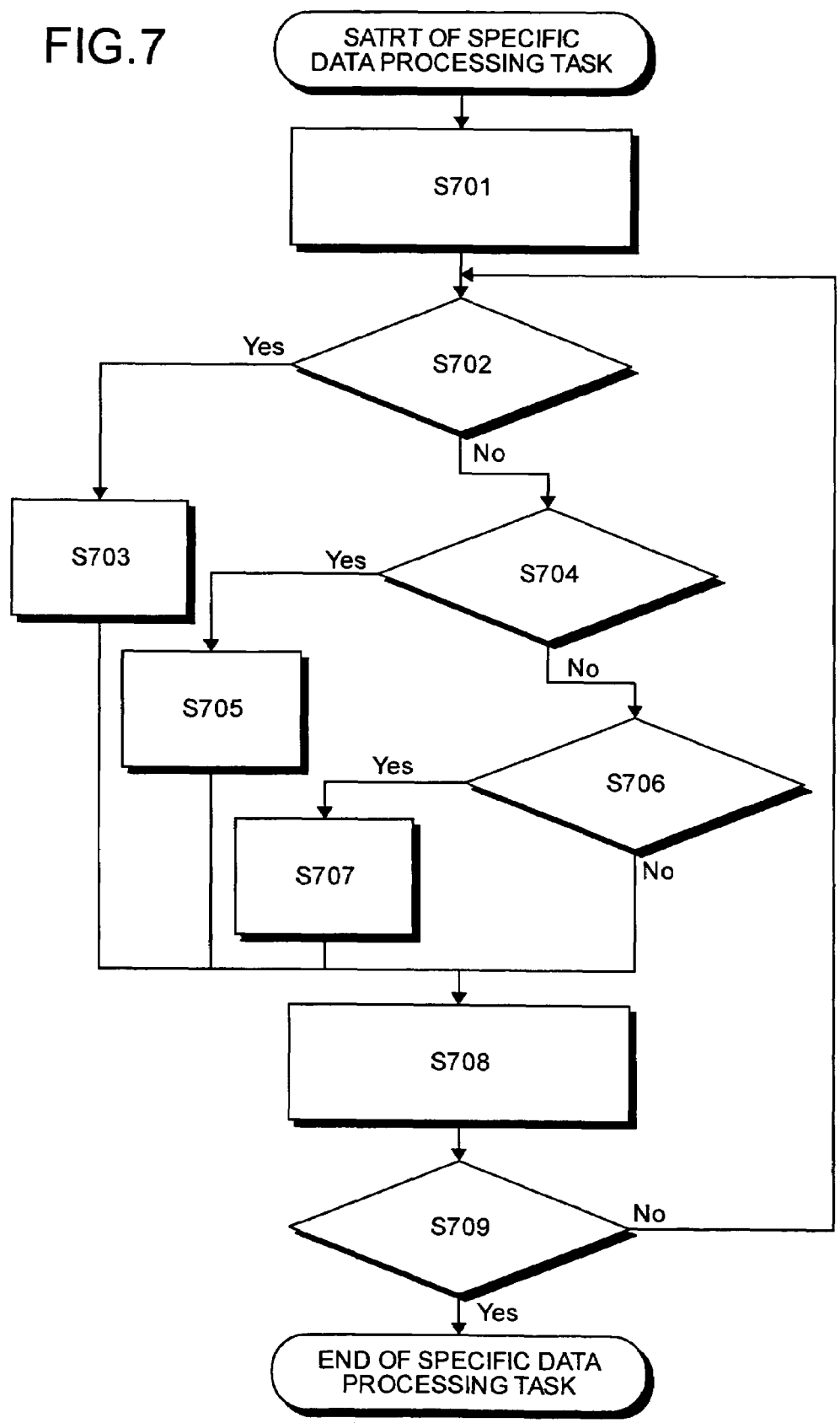
FIG. 7 is a flowchart of a processing procedure of a specific data processing task of an agent processing task according to the first embodiment.

Details of the specific data processing task (step S614) of the agent processing task shown in FIG. 6 according to the first embodiment will be explained below. FIG. 7 is a flowchart of a processing procedure of the specific data processing task of the agent processing task according to the first embodiment. This processing is performed by the specific data processor 38 by reading the comment portion put between the comment starting tag and the comment ending tag extracted by the specific data extracting unit 37, by one line at a time.

The HTTP agent server 36 first reads the next line in the special-character string for identification in the comment portion (step S701), to check if the read line is file data (step S702). If it is file data (step S702, Yes), the HTTP agent server 36 extracts a portion up to the end of the file data. When there is specified information of the file expansion destination compressed and converted to a text format, the HTTP agent server 36 also extracts the specified information. The HTTP agent server 36 binarizes, expands, and stores the file data compressed and converted to the text format, based on the specified information of the file expansion destination. When there is no specified information of the file expansion destination, the HTTP agent server 36 expands the file data at a predetermined expansion destination for default (step S703).

If the read line is not the file data (step S702, No), the HTTP agent server 36 checks if the line is setup data (step S704). If it is the setup data (step S704, Yes), the HTTP agent server 36 extracts a portion up to the end of the setup data. The HTTP agent server 36 then performs setup processing of the network-connected equipment 1 as specified based on the extracted setup data (step S705).

If the read line is not the setup data (step S704, No), the HTTP agent server 36 checks if it is a script (step S706). If it is a script (step S706, Yes), the HTTP agent server 36 makes the network-connected equipment 1 execute the processing described in the script (step S707).

When the file expansion processing (step S703), the setup processing (step S705), or the script execution processing (step S707) finishes, the HTTP agent server 36 reads the next line (step S708), to check if all the processing has finished (step S709). When the line read at step S701 is not a script (step S706, No), control proceeds to step S708.

When all the processing has finished (step S709, Yes), the HTTP agent server 36 finishes the specific data processing task. If there is still remaining processing (step S709, No), the HTTP agent server 36 repeats the above processing (from step S702 to step S708).

In the first embodiment, the network-connected equipment 1 having no user interface is provided with the function of the HTTP agent server 36, and uses the user interface 42 of the setting personal computer 2 to access the web server 3 via the HTTP agent server 36 in the network-connected equipment 1, and the HTTP agent server 36 obtains the HTML format data in which the specific data for the network-connected equipment 1 is padded, and extracts the specific data required for the network-connected equipment 1 therefrom, to perform the processing. Therefore, even when there is the firewall 4, the user 43 can easily transfer-data to the network-connected equipment 1 having no user interface so as to perform the processing of the data, without taking time and energy, such that the user 43 once transfers the data to the setting personal computer 2, and re-transfers the data to the network-connected equipment 1 to perform processing.

As described above, the network-connected equipment having no user interface relays an access between the server and a client on the network to represent for the access. The server pads processing data processed by the network-connected equipment in the transfer-data to be transferred to the client as a response to the access, to create the transfer-data. The network-connected equipment then obtains the transfer-data, and extracts the processing data to perform the processing. As a result, even if a firewall is set up in the network to which the network-connected equipment is connected, the processing data can be easily transferred to the network-connected equipment so as to perform the processing of the data, without taking time and energy, such that the user once transfers the processing data to the setting personal computer, and re-transfers the data to the network-connected equipment.

Since the data required for the network-connected equipment is obtained from the server on the network, the data does not become out-dated as in the case of obtaining the data from a recording medium attached to the network-connected equipment, and when the data is updated by the server on the network, the updated data can be received at any time via the network.

Pre-specified special-character string for identification indicating the data area, in which the processing data processed by the network-connected equipment is described, is padded in the comment portion in the comment tag in the markup language format data, transferred to the network-connected equipment as a response to the access from the client to the sever, and the processing data is padded in the data area. Therefore, even when the firewall is set up in the network to which the network-connected equipment is connected, the markup language format data can be easily transferred to the network-connected equipment from the server, so that the network-connected equipment can perform the processing of the processing data in the data area indicated by the special-character string for identification.

With respect to a processing program in the markup language format data, such as the web browser operated by the equipment connected to the network other than the network-connected equipment, the processing of the markup language format data, in which the processing data is padded, can be performed as normal markup language format data.

The network-connected equipment further monitors the special-character string for identification in the markup language format data obtained from the server, and extracts the processing data in the data area indicated by the special-character string for identification, to perform processing of the processing data, corresponding to the type of the extracted processing data. Therefore, only the processing data processed by the network-connected equipment can be extracted from the markup language format data, which passes through the network-connected equipment, and can be processed by the network-connected equipment according to the type of the extracted processing data.

The text format file to be processed by the network-connected equipment is padded in the data area indicated by the special-character string for identification in the markup language format data. Therefore, by converting the file to the text format, a file in any format can be easily transferred to the network-connected equipment as the markup language format data.

With respect to the processing program in the markup language format data, such as the web browser operated by the equipment connected to the network other than the network-connected equipment, the processing of the markup language format data, in which the file is padded, can be performed as normal markup language format data.

Since the setup data for the network-connected equipment processed thereby is padded in the data area indicated by the special-character string for identification in the markup language format data, any complicated setup data can be easily transferred to the network-connected equipment as the markup language format data.

With respect to the processing program in the markup language format data, such as the web browser operated by the equipment connected to the network other than the network-connected equipment, the processing of the markup language format data, in which the setup data is padded, can be performed as normal markup language format data.

Since a script to be executed by the network-connected equipment is padded in the data area indicated by the special-character string for identification in the markup language format data, any complicated script can be easily transferred to the network-connected equipment as the markup language format data.

With respect to the processing program in the markup language format data, such as the web browser operated by the equipment connected to the network other than the network-connected equipment, the processing of the markup language format data, in which the script is padded, can be performed as normal markup language format data.

When the processing data processed by the network-connected equipment is a text format file, the file is extracted and stored. Therefore, only the file to be processed by the network-connected equipment can be extracted from the markup language format data, which passes through the network-connected equipment, so that storage of the file, update of the already stored file, and the like can be easily performed.

When the processing data processed by the network-connected equipment is the setup data for the network-connected equipment, the setup data is extracted and the setup of the network-connected equipment is performed according to the extracted setup data. As a result, only the setup data to be processed by the network-connected equipment can be extracted from the markup language format data, which passes through the network-connected equipment, and setup of the network-connected equipment, a partial change of the setup, update of the setup, and the like can be easily performed.

When the processing data processed by the network-connected equipment is a script executed by the network-connected equipment, the script is extracted and the processing is executed by the network-connected equipment according to the extracted script. As a result, only the script to be executed by the network-connected equipment can be extracted from the markup language format data, which passes through the network-connected equipment, and processing such as compression and decompression processing of a file, file operation, reactivation of the software currently under operation, reactivation of the network-connected equipment, and the like can be easily performed by the network-connected equipment.

In the first embodiment, when a file is transferred, the file is compressed, and converted to a text format, and padded in the HTML format data for response. However, when the file size of the transferred file is large, the time required until the finish of the reception and display processing by the web browser 41 increases, and hence, position data of the file may be padded in the HTML format data for response instead of the file itself, thereby reducing the time required.

Figure 8:
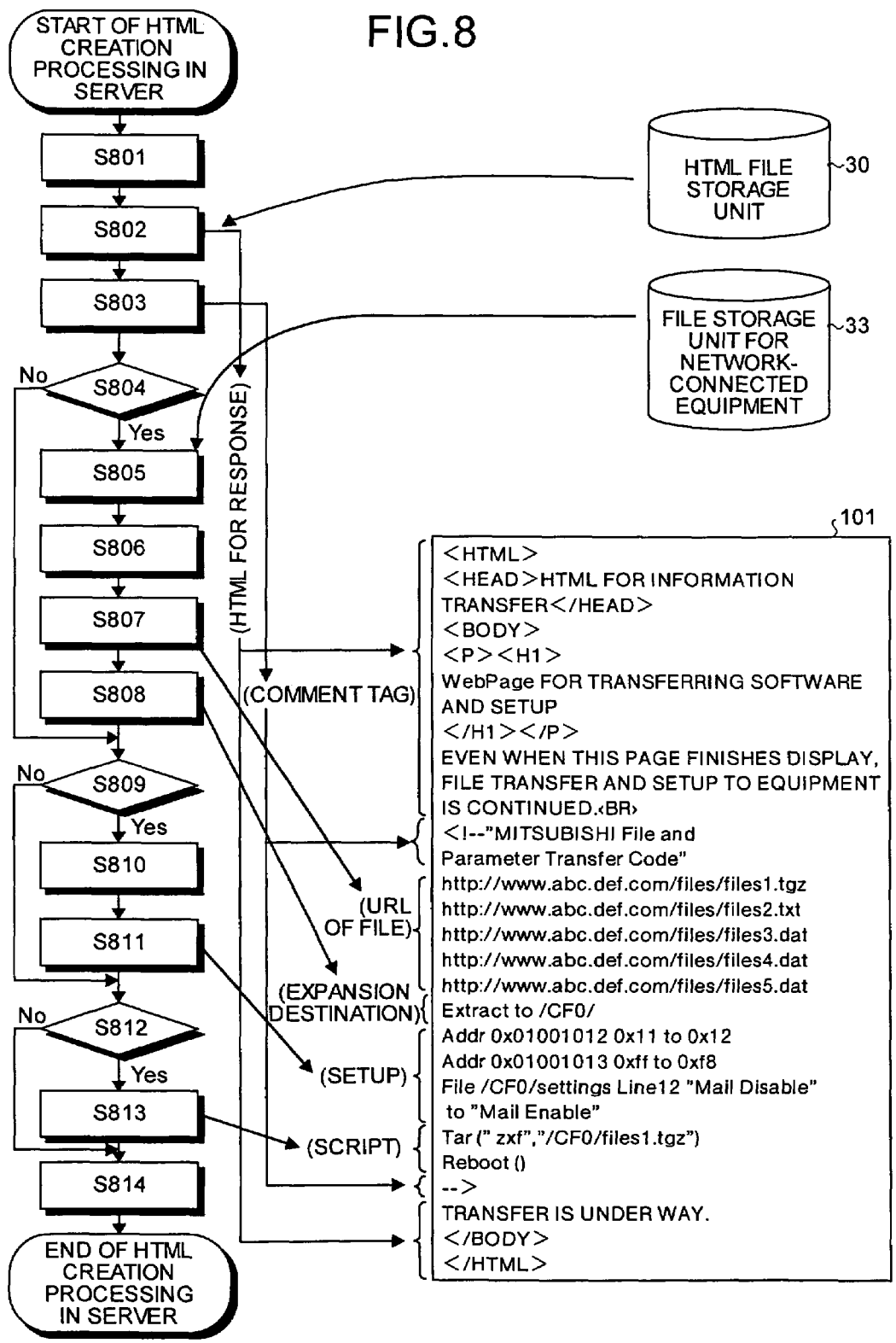
FIG. 8 is a flowchart of a processing procedure in creation processing of HTML format data in a web server according to a second embodiment.

In a second embodiment, therefore, an example in which the position data of the file is padded, instead of padding the file itself, whose processing is performed by the network-connected equipment 1 having no user interface, in the HTML format data for response, will be explained. FIG. 8 is a flowchart of a processing procedure in creation processing of the HTML format data in a web server 3 according to the second embodiment.

As shown in the drawing, the user 43 requests the web server 3 to transfer specific data to the network-connected equipment 1. The HTTP server unit 34 in the web server 3 receives the request (step S801), selects an appropriate HTML file for response with respect to the request, and obtains the file from the HTML file storage unit 30 (step S802). The HTTP server unit 34 then inserts a comment starting tag, a special-character string for identification, and a comment ending tag in the HTML format data for response (step S803).

Thereafter, the HTTP server unit 34 determines whether there is a file transfer request from the user 43 (step S804). When there is the request (step S804, Yes), the specific data creating unit 32 selects a single or a plurality of files from the file storage unit 33 for network-connected equipment (step S805). The specific data creating unit 32 then checks if the file to be transferred is stored in a place accessible by the HTTP server unit 34, and when the file is stored in an inaccessible place, the file is compressed and reproduced on an accessible HTTP server (step S806), to obtain the URL of the file (step S807).

The specific data creating unit 32 specifies the expansion destination at which the obtained compressed file is expanded (step S808). If the expansion destination is not specified, the expansion destination becomes the predetermined expansion destination for default. If there is no file transfer request from the user 43 (step S804, No), control proceeds to step S809.

Subsequently, the HTTP server unit 34 determines whether there is a transfer request of setup data for the network-connected equipment 1 from the user 43 (step S809). If there is the request (step S809, Yes), the specific data creating unit 32 determines setup data required for setup of the network-connected equipment 1 (step S810), and converts the setup data to a text format (step S811). If there is no transfer request of the setup data from the user 43 (step S809, No), control proceeds to step S812.

The HTTP server unit 34 further determines whether there is a transfer request of a script to be executed by the network-connected equipment 1 from the user 43 (step S812). When there is the request (step S812, Yes), the specific data creating unit 32 determines the script to be executed by the network-connected equipment 1 (step S813). When there is no script transfer request from the user 43 (step S812, No), control proceeds to step S814.

When the specific data including the position data of the file, the setup data, and the script is determined through the above processing, the specific data padding unit 31 pads the specific data between the special-character string for identification and the comment ending tag (step S814), to finish the creation processing of the HTML format data.

In the drawing, an example 101 of the HTML format data in which the specific data including the position data of the file is padded is shown. As shown in this drawing, there are the comment starting tag (<!--), the special-character string for identification ("MITSUBISHI File and Parameter Transfer Code") subsequent thereto, and the comment ending tag (-->) in the HTML format data for response, and the URL, being the position data of the file, data of the expansion destination at which the file is expanded, the setup data, and the script are padded therebetween.

The processing procedure in the agent server processing by the HTTP agent server 36 in the network-connected equipment 1 having no user interface and the processing procedure of the agent processing task in the agent server processing according to the second embodiment are the same as those explained in the first embodiment with reference to FIGS. 5 and 6.

The processing procedure of the specific data processing task of the agent processing task according to the second embodiment is different from the processing procedure explained in the first embodiment with reference to FIG. 7, in that the processing at step S702 is changed to processing for checking if the read line shows the URL, being the position data of the file.

Further, the processing at step S703 is changed to processing in which a portion up to the end of the URL data, being the position data of the file, is extracted, the information specifying the expansion destination of the compressed file is extracted, the file is obtained based on the URL data, and the compressed file is expanded according to the information specifying the expansion destination of the file and stored. Other processing is the same as those explained in the first embodiment with reference to FIG. 7.

In the second embodiment, the position data of the file processed by the network-connected equipment 1 on the network is padded in the HTML format data for response. Therefore, when a file of a large size is transferred to the network-connected equipment 1, the time required from when the web browser 41 receives the HTML format data from the web server 3, until the display processing finishes can be reduced, and the user 43 can perform other processing without waiting for the processing by the web browser 41.

As described above, since the position data of the file processed by the network-connected equipment on the network is padded in the data area indicated by the special-character string for identification in the markup language format data, the position data can be easily transferred to the network-connected equipment as the markup language format data.

With respect to the processing program in the markup language format data, such as the web browser operated by the equipment connected to the network other than the network-connected equipment, the processing of the markup language format data, in which the position data of the file is padded, can be performed as normal markup language format data.

When the processing data processed by the network-connected equipment is the position data of the file processed by the network-connected equipment on the network, the position data is extracted to obtain the file from the network based on the extracted position data, and the file is stored. As a result, even when the transfer processing of the markup language format data has finished, the file transfer processing can be continued, and even when a file of a large size is transferred, the time required for the transfer processing can be reduced, and hence, the user can perform other processing without waiting.

As explained above, in the network data-transfer method according to the present invention, the network-connected equipment having no user interface relays an access between the server and the client on the network to represent for the access. The server pads the processing data processed by the network-connected equipment in the transfer-data to be transferred to the client as a response to the access, to create the transfer-data. The network-connected equipment then obtains the transfer-data, and extracts the processing data to perform the processing. As a result, even if a firewall is set up in the network to which the network-connected equipment is connected, the data can be easily transferred to the network-connected equipment, without taking time and energy, so as to be processed.

INDUSTRIAL APPLICABILITY

The network data-transfer method according to the present invention is useful for a method of transferring data from the server on the network to the network-connected equipment having no user interface, such as a printer or a FAX machine, so as to perform the processing. Particularly, the network data-transfer method according to the present invention is suitable for a method of transferring data to the network-connected equipment so as to perform the processing, when the firewall is set up in the network to which the network-connected equipment is connected.

The invention claimed is:

1. A network data-transfer method of transferring data from a server on a network to a network-connected equipment wherein the network-connected equipment which does not have a user interface performs a processing, the network data-transfer method comprising:

relaying an access from a client to the server for the network-connected equipment to perform the processing;

creating a transfer-data to be transferred to the client as a response to the access to the server at the relaying, wherein the transfer-data includes a processing data for the network-connected equipment; and a transfer-data processing by the network-connected equipment, the transfer-data processing including acquiring the transfer-data created at the creating of the transfer data, extracting the processing data from the transfer-data, and performing a processing on the extracted processing data, wherein the creating includes putting, when the server transfers markup language format data to the network-connected equipment as a response to the access, a predetermined special-character string for identification indicating a data area where processing-data to be processed by the network-connected equipment is described in a comment portion in a comment tag of the markup language format data; and putting the processing-data in a data area indicated by the special-character string for identification, and wherein the transfer-data processing includes a data extracting including obtaining the markup language format data from the server, monitoring the special-character string for identification in the markup language format data, and extracting the processing-data located in the data area indicated by the special-character string for identification; and processing the processing-data extracted at the data extracting by the network-connected equipment based on a type of the processing-data.

2. The network data-transfer method according to claim 1, wherein the putting the processing-data includes putting a text format file to be processed by the network-connected equipment in the data area indicated by the special-character string for identification.

3. The network data-transfer method according to claim 1, wherein the putting the processing-data in the data area indicated by the special-character string includes putting setup data for the network-connected equipment to be processed by the network-connected equipment in the data area indicated by the special-character string for identification.

4. The network data-transfer method according to claim 1, wherein the putting the processing-data in the data area indicated by the special-character string includes putting a script that causes the network-connected equipment to perform an execution in the data area indicated by the special-character string for identification.

5. The network data-transfer method according to claim 1, wherein the putting the processing-data in the data area indicated by the special-character string includes putting position data of a file to be processed by the network-connected equipment on the network in the data area indicated by the special-character string for identification.

6. The network data-transfer method according to claim 2, wherein the data extracting includes, when the processing-data to be processed by the network-connected equipment is a text format file, extracting the file, and wherein the processing the processing-data includes storing the extracted file.

7. The network data-transfer method according to claim 3, wherein the data extracting includes, when the processing-data to be processed by the network-connected equipment is the setup data for the network-connected equipment, extracting the setup data, and wherein the processing the processing-data includes setting up the network-connected equipment based on the extracted setup data.

8. The network data-transfer method according to claim 4, wherein the data extracting includes, when the processing-data to be processed by the network-connected equipment is the script, extracting the script, and wherein the processing the processing data includes processing the processing data based on the script.

9. The network data-transfer method according to claim 5, wherein the data extracting includes, when the processing-data to be processed by the network-connected equipment is a text format file, extracting the position data, extracting the position data, and wherein the processing the processing-data includes, based on the extracted position data, acquiring the file to be processed by the network-connected equipment from the network, and storing the file.

* * * * *